United States Patent
Nakashima et al.

(10) Patent No.: US 10,767,067 B2
(45) Date of Patent: Sep. 8, 2020

(54) NON-AQUEOUS INKJET INK COMPOSITION

(71) Applicant: SAKATA INX CORPORATION, Osaka-shi, Osaka (JP)

(72) Inventors: Okinori Nakashima, Osaka (JP); Yoshiyuki Aoki, Osaka (JP); Jun Kinjyo, Osaka (JP); Ryohei Miyake, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 0 days.

(21) Appl. No.: 16/094,841

(22) PCT Filed: Feb. 23, 2017

(86) PCT No.: PCT/JP2017/006781
§ 371 (c)(1),
(2) Date: Oct. 18, 2018

(87) PCT Pub. No.: WO2017/187745
PCT Pub. Date: Nov. 2, 2017

(65) Prior Publication Data
US 2019/0144694 A1 May 16, 2019

(30) Foreign Application Priority Data
Apr. 28, 2016 (JP) .................................. 2016-091912

(51) Int. Cl.
| | | |
|---|---|---|
| *C09D 11/36* | (2014.01) | |
| *C09D 7/63* | (2018.01) | |
| *C09D 133/08* | (2006.01) | |
| *C09D 133/10* | (2006.01) | |
| *C09D 161/16* | (2006.01) | |
| *C08K 5/06* | (2006.01) | |
| *C08K 5/109* | (2006.01) | |
| *B41M 5/00* | (2006.01) | |

(52) U.S. Cl.
CPC .............. *C09D 11/36* (2013.01); *B41M 5/00* (2013.01); *C09D 7/63* (2018.01); *C09D 133/08* (2013.01); *C09D 133/10* (2013.01); *C09D 161/16* (2013.01); *C08K 5/06* (2013.01); *C08K 5/109* (2013.01)

(58) Field of Classification Search
None
See application file for complete search history.

(56) References Cited

U.S. PATENT DOCUMENTS

| | | | | |
|---|---|---|---|---|
| 10,385,225 B2 * | 8/2019 | Sato | .................... | C09B 67/0041 |
| 2005/0204959 A1 | 9/2005 | Kano et al. | | |
| 2005/0256247 A1 | 11/2005 | Kano et al. | | |
| 2008/0119593 A1 * | 5/2008 | Stramel | ................. | C09D 11/36 |
| | | | | 524/111 |
| 2009/0095201 A1 * | 4/2009 | Heitzmann | ......... | C09B 67/0002 |
| | | | | 106/31.85 |
| 2010/0047455 A1 * | 2/2010 | Hoogmartens | ...... | C09D 11/322 |
| | | | | 427/258 |
| 2011/0009537 A1 * | 1/2011 | Kotera | ................... | C09D 11/36 |
| | | | | 524/106 |
| 2013/0190421 A1 * | 7/2013 | King | .................... | C09D 11/322 |
| | | | | 523/102 |
| 2014/0326164 A1 * | 11/2014 | Loccufier | ............ | C09B 67/0009 |
| | | | | 106/31.6 |
| 2016/0194508 A1 | 7/2016 | Yodo et al. | | |
| 2016/0222229 A1 * | 8/2016 | Yamada | ................. | C09D 11/40 |
| 2018/0327620 A1 * | 11/2018 | Sato | ....................... | C09D 11/36 |
| 2019/0161634 A1 * | 5/2019 | Kinjoh | ................. | C09D 11/106 |
| 2019/0177563 A1 * | 6/2019 | Nakashima | .......... | C09D 11/037 |

(Continued)

FOREIGN PATENT DOCUMENTS

| | | |
|---|---|---|
| JP | H08239614 A | 9/1996 |
| JP | 2003128960 A | 5/2003 |
| JP | 2004083872 A | 3/2004 |

(Continued)

OTHER PUBLICATIONS

Notification Concerning Transmittal of International Preliminary Report on Patentability (PCT/IB326) and Notification of Transmittal of Translation of the International Preliminary Report on Patentability (PCT/IB338) dated Nov. 8, 2018, with International Preliminary Report on Patentability (PCT/IB/373) and Written Opinion of the International Searching Authority (PCT/ISA/237), for corresponding international application PCT/JP2017/006781.
International Search Report (ISR) dated May 9, 2017, issued for International application No. PCT/JP2017/006781.
A Notification of Reasons for Refusal issued by the Japanese Patent Office, dated Jan. 7, 2020, for Japanese counterpart application No. 2016-091912. (5 pages).
Extended European Search Report (EESR) dated Nov. 12, 2019, issued for European counterpart patent application No. EP17789034.0 (6 pages).

*Primary Examiner* — Helene Klemanski
(74) *Attorney, Agent, or Firm* — Law Office of Katsuhiro Arai

(57) ABSTRACT

An object is to provide a non-aqueous inkjet ink composition which offers excellent fine print reproducibility, solid fill property, and anti-mottling property on printed matters, even when it is printed, at high speed, on materials whose printing surface is constituted by a polyvinyl chloride polymer, ethylene-vinyl acetate copolymer, or other vinyl polymer, etc., and which also offers excellent rub resistance, solvent resistance, discharge stability, and resolubility of dried coating film, and has a high flash point. To achieve the object, a non-aqueous inkjet ink composition is provided which contains an acrylic resin, a ketone resin, a pigment, and a pigment dispersant, as well as propylene carbonate and diethylene glycol alkyl ether as an organic solvent.

7 Claims, No Drawings

(56) References Cited

U.S. PATENT DOCUMENTS

2019/0284415 A1\* 9/2019 Aoki .................... C09D 11/322

FOREIGN PATENT DOCUMENTS

| | | | |
|---|---|---|---|
| JP | 2004307600 | A | 11/2004 |
| JP | 2005200469 | A | 7/2005 |
| JP | 5001855 | B2 | 8/2012 |
| JP | 2013082226 | B | 5/2013 |
| JP | 2013147626 | A | 8/2013 |
| JP | 2014132050 | A | 7/2014 |
| JP | 2015007206 | A | 1/2015 |
| WO | 03076527 | A1 | 9/2003 |
| WO | 2004000950 | A1 | 12/2003 |
| WO | 2005014280 | A1 | 2/2005 |
| WO | 2007072804 | A1 | 6/2007 |
| WO | 2010133889 | A2 | 11/2010 |
| WO | WO 2010/133890 | A1 \* | 11/2010 |
| WO | 2015020128 | A1 | 2/2015 |
| WO | WO 2017/018050 | A1 \* | 2/2017 |
| WO | WO 2018/034090 | A1 \* | 1/2018 |

\* cited by examiner

NON-AQUEOUS INKJET INK COMPOSITION

CROSS-REFERENCE TO RELATED APPLICATIONS

This application is the U.S. National Phase under 35 U.S.C. § 371 of International Application PCT/JP2017/006781, filed Feb. 23, 2017, which claims priority to Japanese Patent Application No. 2016-091912, filed Apr. 28, 2016. The International Application was published under PCT Article 21(2) in a language other than English.

TECHNICAL FIELD

The present invention relates to a non-aqueous inkjet ink composition suitable for manufacturing large-size signboard ads, etc., whose printing surface is constituted primarily by a vinyl chloride polymer or ethylene-vinyl acetate copolymer, as well as a printed matter obtained by using such ink composition.

BACKGROUND ART

An increasing number of recent signboard ads feature logos and patterns of vivid colors and sophisticated designs, as well as photographic images of products and human faces. In addition, a considerable number of signboards are now large in size, so that they can give strong impact on the viewers.

Traditionally, signboard ads are produced by cutting out colored sheets in the shapes of letters and attaching them to generate logos, or by using various types of printing presses to create photographic images, in general. However, these production methods present problems in that they require a lot of time and cumbersome steps, as well as large-scale equipment such as printing presses.

Accordingly, attempts are made to utilize the inkjet method, which allows designs created on a personal computer to be printed directly on a base material, to make it easier to produce signboards featuring vivid images.

One feature of the inkjet method is that it accommodates a wide range of materials to be used as base materials for printing, thus providing a convenient way to print on sheets made of both hard and soft materials such as paper, polymers and metals. Particularly when printed signboard ads are installed outdoors and thus have a range of performance requirements including light weight, excellent strength and durability, resistance to rain, and affordable cost, the inkjet method presents a great advantage in that it makes it easy to print on polymer sheets that have these properties.

In addition, recent years have seen the emergence of super-wide-format inkjet printers having a printing width of 2,000 mm or even greater, and these inkjet printers permit production of large-size printed matters with a single swoop, instead of printing smaller segments and attaching them together as before, and this is one of the reasons that are making signboard production much easier.

In general, tarpaulins are commonly used as polymer sheets for signboard ads. It should be noted that a tarpaulin is a composite sheet produced by laminating the top and bottom of a polyester or polyamide core material with a polyvinyl chloride polymer, ethylene-vinyl acetate copolymer, or other vinyl polymer.

Among the inkjet ink compositions used for printing on these composite sheets are non-aqueous inkjet ink compositions based on organic solvents (or more recently, environmentally-friendly organic solvents). Non-aqueous inkjet ink compositions require use of materials having good wettability, drying property, fixing property, etc., with respect to polyvinyl chloride polymers, ethylene-vinyl acetate copolymers, and other vinyl polymers that are used as the surface materials for composite sheets.

Known methods to meet this requirement include using alkylene glycol monoether monoester and cyclic ester as an organic solvent (refer to Patent Literature 1), using a vinyl polymer as a binder resin, and an organic solvent that contains a specified quantity of environmentally-friendly polyalkylene glycol dialkyl ether (refer to Patent Literature 2), and blending specified quantities of diethylene glycol ethyl methyl ether and propylene carbonate as an organic solvent (refer to Patent Literature 3).

In recent years, however, the demand for higher printing speeds has given rise to the problems of insufficient filling of solid areas (hereinafter referred to as "solid fill"), poor discharge stability and mottling, as well as the problem of solidification of ink in the waste tube, when conventional non-aqueous inkjet ink compositions (especially non-aqueous inkjet ink compositions using environmentally-friendly organic solvents) are printed.

In addition, prior art is associated with maintenance problems, because when the ink remains in the printer for an extended period of time, the ink deposits on the maintenance members of the printer become dry and break away, to accumulate in, and consequently clog, the waste tube, etc.

BACKGROUND ART LITERATURE

Patent Literature

Patent Literature 1: Japanese Patent Laid-open No. 2005-200469
Patent Literature 2: International Patent Laid-open No. WO2007/072804
Patent Literature 3: International Patent Laid-open No. WO2015/020128

SUMMARY OF THE INVENTION

Problems to be Solved by the Invention

An object of the present invention is to provide a non-aqueous inkjet ink composition which offers excellent fine print reproducibility, solid fill property, and anti-mottling property on printed matters, even when it is printed, at high speed, on materials whose printing surface is constituted by a polyvinyl chloride polymer, ethylene-vinyl acetate copolymer, or other vinyl polymer, etc., and which also offers excellent rub resistance, solvent resistance, discharge stability, and resolubility of dried coating film, and has a high flash point.

Means for Solving the Problems

The inventors of the present invention studied in earnest to achieve the aforementioned object and eventually found a solution, which is the present invention, by discovering that the object can be achieved by blending specified quantities of diethylene glycol dialkyl ether and propylene carbonate as an organic solvent, and by blending acrylic resin and ketone resin as a binder resin.

To be specific, the present invention represents the following:

(1) A non-aqueous inkjet ink composition containing an acrylic resin, a ketone resin, a pigment, and a pigment dispersant, and also containing propylene carbonate and diethylene glycol dialkyl ether as an organic solvent.
(2) A non-aqueous inkjet ink composition according to (1), wherein the acrylic resin and the ketone resin are contained at an "acrylic resin/ketone resin" ratio by mass of 1.0 to 40.0.
(3) A non-aqueous inkjet ink composition according to (1) or (2), wherein the propylene carbonate is contained by 5 to 25 percent by mass, and the diethylene glycol dialkyl ether is contained so that its ratio to the propylene carbonate by mass, or specifically the "diethylene glycol dialkyl ether/ propylene carbonate" ratio by mass, falls between 3.0 and 8.0, in the ink composition.
(4) A non-aqueous inkjet ink composition according to any one of (1) to (3), wherein the diethylene glycol dialkyl ether is diethylene glycol ethyl methyl ether and/or diethylene glycol diethyl ether.
(5) A non-aqueous inkjet ink composition according to any one of (1) to (4), wherein the acrylic resin is contained by 1 to 15 percent by mass in the ink composition.
(6) A non-aqueous inkjet ink composition according to any one of (1) to (5), wherein the ketone resin is contained by 0.1 to 10 percent by mass in the ink composition.

Effects of the Invention

The non-aqueous inkjet ink composition proposed by the present invention contains an acrylic resin, a ketone resin, a pigment, and a pigment dispersant, as well as specified quantities of diethyl glycol dialkyl ether and propylene carbonate as an organic solvent.

This way, a non-aqueous inkjet ink composition can be provided, which offers excellent fine print reproducibility, solid fill property, and anti-mottling property on printed matters, even when it is printed, at high speed, on materials whose printing surface is constituted by a polyvinyl chloride polymer, ethylene-vinyl acetate copolymer, or other vinyl polymer, etc., and which also offers excellent rub resistance, solvent resistance, and discharge stability, further demonstrates improved resolubility of dried coating film and therefore offers excellent property to prevent clogged tubes, and has a high flash point.

Mode for Carrying Out the Invention (Acrylic Resin)
The acrylic resin that constitutes the non-aqueous inkjet ink composition proposed by the present invention may be a polymer constituted by a meth(acrylate) soluble in organic solvents, or copolymer of such polymers, or the like. Such meth(acrylate) may be, for example, ethyl, propyl or butyl (meth)acrylate, or other alkyl (meth)acrylate; hydroxy methyl, hydroxy ethyl, hydroxy propyl, hydroxy butyl, hydroxy pentyl (meth)acrylate, or other hydroxy alkyl (meth)acrylate; or the like.

Specific examples of acrylic resins that may be used include BR-60, BR-64, BR-75, BR-77, BR-83, BR-87, BR-88, BR-90, BR-93, BR-95, BR-105, BR-106, BR-107, BR-108, BR-113, BR-115, and BR-116 manufactured by Mitsubishi Rayon, and the like.

Any of these acrylic resins may be used alone, or two or more of them may be combined.

The use quantity of the acrylic resin is preferably 1.0 to 15.0 percent by mass, or more preferably 1.0 to 10.0 percent by mass, or yet more preferably 1.0 to 7.0 percent by mass, relative to the total quantity of the non-aqueous inkjet ink composition.

If the total use quantity of the acrylic resin is smaller than 1 percent by mass, the ink composition may not fix on the base material sufficiently and therefore bleed; if its total use quantity exceeds 15.0 percent by mass, on the other hand, the solids content becomes excessive and the discharge stability may drop.

(Ketone Resin)
The ketone resin that constitutes the non-aqueous inkjet ink composition proposed by the present invention is not limited in any way, and any known ketone resin may be used so long as it dissolves in the organic solvents mentioned below. Examples include the following, among others: (1) ketone resins obtained by causing acetophenone or other aromatic ketone compound, cyclohexanone or other alicyclic ketone compound or other compound containing ketone group, to react with formaldehyde or other aldehyde compound; (2) ketone resins containing hydroxyl group, obtained by hydrogenating any of the foregoing; and (3) urethane-modified ketone resins containing hydroxyl group, obtained by causing a ketone resin containing hydroxyl group to react with isophorone diisocyanate or other polyisocyanate compound.

Specific examples of ketone resins that may be used include K-90 manufactured by Arakawa Chemical Industries, TEGO® VariPlus SK, VariPlus AP, and VariPlus 1201 manufactured by Evonik Japan, and the like.

Any of these ketone resins may be used alone, or two or more of them may be combined.

The use quantity of the ketone resin is preferably 0.1 to 10 percent by mass, or more preferably 0.1 to 7.5 percent by mass, or yet more preferably 0.1 to 5 percent by mass, relative to the total quantity of the non-aqueous inkjet ink composition.

If the total use quantity of the ketone resin is smaller than 0.1 percent by mass, the resolubility of dried ink coating film may drop; if its total use quantity exceeds 10.0 percent by mass, on the other hand, the rub resistance and solvent resistance of the printed matter may drop.

Also, under the present invention, the content ratio of the acrylic resin and the ketone resin, or specifically the result of "acrylic resin/ketone resin" calculated based on mass, may take any value within a range where both resins are effectively contained. However, the "acrylic resin/ketone resin" is preferably 1.0 to 40.0, or more preferably 3.0 to 20.0, or yet more preferably 4.5 to 15.0, or most preferably 7.0 to 13.0.

It should be noted that, to the extent that the aforementioned performance properties do not drop, resins other than the aforementioned acrylic resins and ketone resins, such as vinyl chloride resins, vinyl chloride-vinyl acetate resins, ethylene-vinyl acetate resins, styrene-acrylic resins, styrene-maleate resins, rosin resins, rosin ester resins, petroleum resins, coumarone indene resins, terpene phenol resins, phenol resins, urethane resins, melamine resins, urea resins, epoxy resins, cellulose resins, xylene resins, alkyd resins, aliphatic hydrocarbon resins, butyral resins, maleate resins, fumarate resins, etc., may also be used concomitantly.

(Pigment)
For the pigment that constitutes the non-aqueous inkjet ink composition proposed by the present invention, any known inorganic or organic pigment, etc., traditionally used in non-aqueous inkjet ink compositions may be used.

Specific examples of known inorganic pigments include carbon black, titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermillion, molybdate orange, yellow lead, chrome yellow, cadmium yellow, yellow iron oxide, titanium yellow, chromium oxide, viridian, cobalt green, titanium cobalt green, cobalt chrome green, sea blue, ultramarine blue, Prussian blue, cobalt blue, cerulean blue, manganese violet, cobalt violet, mica, and the like.

Specific examples of organic pigments include azo, azomethine, polyazo, phthalocyanine, quinacridone, anthraquinone, indigo, thioindigo, quinophthalone, benzimidazolone, isoindoline, isoindolinone, and other organic pigments, while specific examples in color index include pigment black 7, pigment blue 15, 15:1, 15:3, 15:4, 15:6, 60, pigment green 7, 36, pigment red 9, 48, 49, 52, 53, 57, 97, 122, 149, 168, 177, 178, 179, 206, 207, 209, 242, 254, 255, pigment violet 19, 23, 29, 30, 37, 40, 50, pigment yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, pigment orange 36, 43, 51, 55, 59, 61, 71, 74, and the like.

Any of these pigments may be used alone, or two or more of them may be combined, where the use quantity of the pigment is preferably 1.0 to 10.0 percent by mass, or more preferably 2.0 to 7.0 percent by mass, relative to the total quantity of the non-aqueous inkjet ink composition. If the use quantity of the pigment is smaller than 1.0 percent by mass, the coloring power may not be sufficient; if its use quantity is greater than 10.0 percent by mass, on the other hand, the viscosity rises and the fluidity of the ink may drop.

(Pigment Dispersant)

Next, for the pigment dispersant that constitutes the non-aqueous inkjet ink composition proposed by the present invention, an ionic or nonionic surface-active agent, or anionic, cationic, or nonionic polymer compound, etc., may be used.

Among these, polymer compounds are preferred; for example, carbodiimide compounds described in Japanese Patent Laid-open No. 2004-083872, International Patent Laid-open No. WO2003/076527, and International Patent Laid-open No. WO2004/000950, AJISPER (manufactured by Ajinomoto Fine-Techno), SOLSPERSE (manufactured by Lubrizol), DISPERBYK (manufactured by BYK), EFKA (manufactured by EFKA Additives), etc., are preferred. Any of these pigment dispersants may be used alone, or two or more of them may be combined.

It should be noted that any of the aforementioned pigment dispersants may be selected as deemed appropriate according to the types of the pigment and organic solvent used.

(Organic Solvent)

For the organic solvent that constitutes the non-aqueous inkjet ink composition proposed by the present invention, diethylene glycol dialkyl ether is used preferably by 40.0 to 80.0 percent by mass in the non-aqueous inkjet ink composition, and propylene carbonate is used preferably by 5.0 to 25.0 percent by mass, or from the viewpoint of improving the drying property further, more preferably by 5.0 to 20.0 percent by mass, or most preferably by 5.0 to 15.0 percent by mass, in the non-aqueous inkjet ink composition.

Furthermore, the diethylene glycol alkyl ether and the propylene carbonate are used so that "diethylene glycol dialkyl ether/propylene carbonate" falls preferably between 3 and 8, or more preferably between 5 and 8.

By combining diethylene glycol dialkyl ether and propylene carbonate, excellent wettability, fixing property, solid fill property and discharge stability can be achieved, even under high-speed printing.

Also, to further adjust the drying property and improve the anti-mottling property, an alkylene glycol derivative with a flash point of 50 to 150° C., other than diethylene glycol dialkyl ether, may also be used concomitantly.

Examples of such alkylene glycol derivative with a flash point of 50 to 150° C. include ethylene glycol diethyl ether, ethylene glycol dimethyl ether, triethylene glycol dimethyl ether, triethylene glycol diethyl ether, tetraethylene glycol dimethyl ether, and other (poly)ethylene glycol dialkyl ethers, propylene glycol dimethyl ether, propylene glycol diethyl ether, dipropylene glycol dimethyl ether, dipropylene glycol diethyl ether, propylene glycol diethyl ether, tetraethylene glycol dimethyl ether, and other (poly)propylene glycol dialkyl ethers, propylene glycol monomethyl ether, propylene glycol monoethyl ether, propylene glycol monobutyl ether, dipropylene glycol monomethyl ether, dipropylene glycol monoethyl ether, and other (poly)polypropylene glycol monoalkyl ethers, propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoethers, ethylene glycol monomethyl acetate, ethylene glycol monoethyl acetate, ethylene glycol monobutyl acetate, diethylene glycol monomethyl acetate, triethylene glycol monomethyl acetate, and other (poly)ethylene glycol monoesters, ethylene glycol diacetate, diethylene glycol diacetate, triethylene glycol diacetate and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol propyl ether acetate, triethylene glycol monobutyl ether, triethylene glycol ethyl ether acetate, triethylene glycol butyl ether acetate, and other (poly)ethylene glycol monoether monoesters, and the like.

Also, preferably the total quantity of the organic solvent accounts for 80.0 to 98.0 percent by mass in the total ink composition. If this total quantity exceeds 98.0 percent by mass, the printability of the obtained ink drops; on the other hand, a total quantity smaller than 80.0 percent by mass tends to induce a rise in the viscosity of the ink and cause the ink discharge property from the nozzle to drop, which is not desirable.

(Other Components)

Furthermore, other resins may be added to, and various additives such as surface-active agent, plasticizer, surface adjusting agent, ultraviolet-protective agent, photostabilizer, and antioxidant may also be used in, the non-aqueous inkjet ink composition proposed by the present invention, as necessary, to the extent that the effects of the present invention are not diminished.

[Manufacturing of Non-Aqueous Inkjet Ink Composition]

Next, a method for manufacturing the non-aqueous inkjet ink composition proposed by the present invention using these materials is explained.

The non-aqueous inkjet ink composition proposed by the present invention may be obtained by, for example, dispersing and mixing the materials using a wet circulation mill, bead mill, ball mill, sand mill, attritor, roll mill, DCP mill, agitator, Henschel mixer, colloid mill, supersonic homogenizer, high-pressure homogenizer (Microfluidizer, Nanomizer, Ultimizer, Genus PY, DeBEE2000, etc.), pearl mill, or other disperser, with the viscosity of the non-aqueous inkjet ink composition adjusted to a range of 2 to 10 mPa·s.

The total organic solvent content in the non-aqueous inkjet ink composition proposed by the present invention represents the total quantity of the ink composition less the total quantity of the binder resin, pigment, pigment dispersant, and other additives used as necessary; however, preferably this content is adjusted as deemed appropriate so that the viscosity of the ink falls within the aforementioned range.

The non-aqueous inkjet ink composition proposed by the present invention, thus obtained, may be used, by means of an inkjet printer, on a base material whose surface layer, at least, is constituted by a vinyl chloride polymer, ethylene-vinyl acetate copolymer, etc.

[Applications]

While it may be used for commonly-known applications, the non-aqueous inkjet ink composition proposed by the present invention is particularly suitable for use on the surface layer, constituted by a nonabsorbent material, of a base material. Nonabsorbent materials include metals, resins, ceramics, etc., but preferably the present invention is used on a surface layer based on a resin material, or better yet on a surface layer constituted by a vinyl chloride polymer or ethylene-vinyl acetate copolymer as a specific example of the resin, from the viewpoints of solid fill, stickiness and other properties that affect printability.

EXAMPLES

The following explains the present invention in greater detail by citing examples; however, the present invention is not limited to these examples. It should be noted that, unless otherwise specified, "%" and "part" indicate "percent by mass" and "part by mass," respectively.

The materials used in the Examples and Comparative Examples described below are as follows.
<Pigment Dispersants>
SOLSPERSE 39000 (manufactured by Lubrizol)
SOLSPERSE 56000 (manufactured by Lubrizol)
PB822: AJISPER PB822 (manufactured by Ajinomoto Fine-Techno)
<Pigments>
MA7: Carbon Black MA7 (manufactured by Mitsubishi Chemical)
D7110F: HELIOGEN Blue D7110F (manufactured by BASF)
G01: LEVASCREEN Yellow G01 (manufactured by LANXESS)
RGT: FASTOGEN Super Magenta RGT (manufactured by DIC)
<Acrylic Resins>
BR-83: DIANAL BR-83 (manufactured by Mitsubishi Rayon, grass transition temperature 105° C., mass average molecular weight 40,000)
BR-87: DIANAL BR-87 (manufactured by Mitsubishi Rayon, grass transition temperature 105° C., mass average molecular weight 25,000)
BR-60: DIANAL BR-60 (manufactured by Mitsubishi Rayon, grass transition temperature 75° C., mass average molecular weight 70,000)
BR-106: DIANAL BR-106 (manufactured by Mitsubishi Rayon, grass transition temperature 50° C., mass average molecular weight 60,000)
<Ketone Resins>
SK: TEGO® VariPlus SK (manufactured by Evonik Japan, aromatic ketone-formaldehyde condensed hydrogenated ketone resin)
AP: TEGO® VariPlus AP (manufactured by Evonik Japan, aromatic ketone-formaldehyde condensed ketone resin)

Examples 1 to 18 and Comparative Examples 1 and 2

(Manufacturing of Base Inks of Different Colors>
<Manufacturing of Non-Aqueous Inkjet Base Black Ink>

After dissolving 10 parts of a pigment dispersant (SOLSPERSE 39000) in 65 parts of diethylene glycol diethyl ether, and further mixing in 25 parts of a pigment (MA7) under agitation, the mixture was kneaded using a bead mill, to obtain a non-aqueous inkjet base blank ink.
<Manufacturing of Non-Aqueous Inkjet Base Cyan Ink>

After dissolving 10 parts of a pigment dispersant (SOLSPERSE 56000) in 65 parts of diethylene glycol diethyl ether, and further mixing in 25 parts of a pigment (D7110F) under agitation, the mixture was kneaded using a bead mill, to obtain a non-aqueous inkjet base cyan ink.
<Manufacturing of Non-Aqueous Inkjet Base Yellow Ink>

After dissolving 10 parts of a pigment dispersant (PB822) in 65 parts of diethylene glycol diethyl ether, and further mixing in 25 parts of a pigment (G01) under agitation, the mixture was kneaded using a bead mill, to obtain a non-aqueous inkjet base yellow ink.
<Manufacturing of Non-Aqueous Inkjet Base Magenta Ink>

After dissolving 10 parts of a pigment dispersant (SOLSPERSE 56000) in 65 parts of diethylene glycol diethyl ether, and further mixing in 25 parts of a pigment (RGT) under agitation, the mixture was kneaded using a bead mill, to obtain a non-aqueous inkjet base magenta ink.
<Manufacturing of Non-Aqueous Inkjet Ink Composition>

The materials were mixed under agitation according to the composition in Table 1 (the compounding ratio of each material is indicated in percent by mass), to obtain the non-aqueous inkjet ink compositions in Examples 1 to 18 and Comparative Examples 1 and 2.

(Printing Method and Printed Matters)

The non-aqueous inkjet ink compositions in Examples 1 to 18 and Comparative Examples 1 and 2 were each charged in a commercially available inkjet printer and printed solid on a polyvinyl chloride sheet in a high-speed printing mode, to obtain the printed matters in Examples 1 to 18 and Comparative Examples 1 and 2.

<Evaluation>

The printed matters using the non-aqueous inkjet ink compositions in Examples 1 to 18 and Comparative Examples 1 and 2 were evaluated for the properties below. In the following evaluations, A and B indicate that the ink composition is fit for practical use, while C and D indicate problems using the ink composition as a product.

(Viscosity)

The non-aqueous inkjet ink compositions in Examples 1 to 18 and Comparative Examples 1 and 2 were each measured for viscosity at 25° C. using a viscometer (RE100L manufactured by Toki Sangyo).

(Fine Print)

The non-aqueous inkjet ink compositions in Examples 1 to 18 and Comparative Examples 1 and 2 were each used to print text in small font/type on a polyvinyl chloride sheet (product name: Kapjet Gloss Banner, manufactured by Filmolux) in a high-speed printing mode, and the results were visually evaluated for the level of clarity of fine print (characters bled or ran together).

Evaluation Criteria

A: No bleeding nor running together, and clear
B: Bleeding and/or running together, but legible
C: Bleeding and/or running together, and difficult to read (Solid Fill)

The non-aqueous inkjet ink compositions in Examples 1 to 18 and Comparative Examples 1 and 2 were each used to print solid areas on a polyvinyl chloride sheet (product name: Kapjet Gloss Banner, manufactured by Filmolux) in a high-speed printing mode, and the results were visually evaluated for filling of solid areas based on whether or not there were white spots in the images.

Evaluation Criteria

A: There are no white spots.
B: There are some white spots.
C: There are many white spots.

(Anti-Mottling Property)

The non-aqueous inkjet ink compositions in Examples 1 to 18 and Comparative Examples 1 and 2 were each used to print solid areas in mixed colors (red, blue, green) on a polyvinyl chloride sheet (product name: Kapjet Gloss Banner, manufactured by Filmolux) in a standard mode, and the results were visually evaluated for mottled images.

Evaluation Criteria

A: There is no mottling.
B: There is some mottling.
C: There is a lot of mottling.

(Discharge Stability)

The non-aqueous inkjet ink compositions in Examples 1 to 18 and Comparative Examples 1 and 2 were each printed on polyvinyl chloride sheets (product name: Kapjet Gloss Banner, manufactured by Filmolux), and the results were visually evaluated based on how many sheets were printed before unprinted areas appeared.

Evaluation Criteria

A: Unprinted areas appear on or after the 71st sheet, or unprinted areas do not appear until the 100th sheet.
B: Unprinted areas appear between the 51st and 70th sheets.
C: Unprinted areas appear between the 31st and 50th sheets.
D: Unprinted areas appear on or before the 30th sheet.

(Resolubility of Dried Coating Film)

The non-aqueous inkjet ink compositions in Examples 1 to 18 and Comparative Examples 1 and 2 were each filled in a silicon tube of 5 mm in inner diameter and 20 cm in length, and then let stand for five days at 25° C., to produce solidified ink in the tube. Next, each ink composition was filled in the tube again to evaluate, based on the following criteria, whether the solidified ink would dissolve again and the ink would flow out.

Evaluation Criteria

A: The ink flows out quickly.
B: It takes time before the ink flows out.
C: Some ink flows out.
D: The tube remains blocked.

(Rub Resistance)

The non-aqueous inkjet ink compositions in Examples 1 to 18 and Comparative Examples 1 and 2 were each transferred onto a polyvinyl chloride sheet (product name: Kapjet Gloss Banner, manufactured by Filmolux) using a Meyer bar (0.15 mm), and then the coating film was rubbed 100 times with a bleached cloth weighing 500 g using a Gakushin-type rubbing fastness tester (manufactured by Daiei Kagaku Seiki), after which the coating film was visually observed to evaluate the level of removal based on the following criteria.

A: No coating film has been removed.
B: There are surface scratches on the coating film.
C: Some coating film has been removed.
D: Notable portions of the coating film have been removed.

(Solvent Resistance)

The non-aqueous inkjet ink compositions in Examples 1 to 18 and Comparative Examples 1 and 2 were each transferred onto a polyvinyl chloride sheet (product name: Kapjet Gloss Banner, manufactured by Filmolux) using a Meyer bar (0.15 mm), and then the coating film was rubbed five times with a bleached cloth weighing 200 g and moistened with ethanol, using a Gakushin-type rubbing fastness tester (manufactured by Daiei Kagaku Seiki), after which the coating film was visually observed to evaluate the level of removal based on the following criteria.

A: No coating film has been removed.
B: There are surface scratches on the coating film.
C: Some coating film has been removed.
D: Notable portions of the coating film have been removed.

TABLE 1

|  |  | Examples | | | | |
|  |  | 1<br>Black | 2<br>Black | 3<br>Black | 4<br>Black | 5<br>Black |
| --- | --- | --- | --- | --- | --- | --- |
| Pigment | MA7 | 3.50% | 3.50% | 3.50% | 3.50% | 3.50% |
|  | G01 |  |  |  |  |  |
|  | RGT |  |  |  |  |  |
|  | D7110F |  |  |  |  |  |
| Dispersant | RB822 |  |  |  |  |  |
|  | SOLSPERSE 56000 |  |  |  |  |  |
|  | SOLSPERSE 39000 | 1.40% | 1.40% | 1.40% | 1.40% | 1.40% |
| Acrylic resin | BR-87 | 6.00% | 6.00% | 5.00% | 5.20% |  |
|  | BR-83 |  |  |  |  | 4.80% |
|  | BR-60 |  |  | 1.50% | 1.20% | 1.40% |
|  | BR-106 |  |  |  |  |  |
| Ketone resin | SK | 0.60% | 1.00% | 0.40% | 1.00% | 0.80% |
|  | AP |  |  |  |  |  |

TABLE 1-continued

|  |  | | | | | |
|---|---|---|---|---|---|---|
| Solvent | Diethylene glycol diethyl ether | 58.50% | 58.10% | 58.20% | 57.70% | 58.10% |
|  | Diethylene glycol ethyl methyl ether | 20.00% | 20.00% | 20.00% | 20.00% | 20.00% |
|  | Propylene carbonate | 10.00% | 10.00% | 10.00% | 10.00% | 10.00% |
|  | Diethylene glycol ethyl ether acetate |  |  |  |  |  |
|  | Dipropylene glycol monomethyl ether |  |  |  |  |  |
|  | Dipropylene glycol methyl ether acetate |  |  |  |  |  |
|  | Total | 100% | 100% | 100% | 100% | 100% |
|  | Acrylic resin/ketone resin | 10.0 | 6.0 | 16.3 | 6.4 | 7.8 |
|  | Viscosity (mPa·s) | 5.0 | 5.0 | 4.9 | 4.9 | 5.0 |
|  | Flash point | 71° C. or above | 71° C. or above | 71° C. or above | 71° C. or above | 71° C. or above |
|  | Fine print | A | A | A | A | A |
|  | Solid fill | A | A | A | A | A |
|  | Anti-mottling property | A | A | A | A | A |
|  | Discharge stability | A | A | A | A | A |
|  | Resolubility of dried coating film | A | A | A | A | A |
|  | Rub resistance | A | A | A | A | A |
|  | Solvent resistance | A | A | A | A | A |

|  |  | Examples | | | | |
|---|---|---|---|---|---|---|
|  |  | 6 Black | 7 Black | 8 Black | 9 Black | 10 Black |
| Pigment | MA7 | 3.50% | 3.50% | 3.50% | 3.50% | 3.50% |
|  | G01 |  |  |  |  |  |
|  | RGT |  |  |  |  |  |
|  | D7110F |  |  |  |  |  |
| Dispersant | RB822 |  |  |  |  |  |
|  | SOLSPERSE 56000 |  |  |  |  |  |
|  | SOLSPERSE 39000 | 1.40% | 1.40% | 1.40% | 1.40% | 1.40% |
| Acrylic resin | BR-87 | 4.80% | 5.00% | 6.00% | 6.00% | 6.00% |
|  | BR-83 |  |  |  |  |  |
|  | BR-60 |  |  |  |  |  |
|  | BR-106 | 1.20% | 2.00% |  |  |  |
| Ketone resin | SK | 0.60% | 1.50% | 0.60% | 0.60% | 0.60% |
|  | AP |  |  |  |  |  |
| Solvent | Diethylene glycol diethyl ether | 58.50% | 56.60% | 48.50% | 48.50% | 48.50% |
|  | Diethylene glycol ethyl methyl ether | 20.00% | 20.00% | 20.00% | 20.00% | 20.00% |
|  | Propylene carbonate | 10.00% | 10.00% | 10.00% | 10.00% | 10.00% |
|  | Diethylene glycol ethyl ether acetate |  |  | 10.00% |  |  |
|  | Dipropylene glycol monomethyl ether |  |  |  | 10.00% |  |
|  | Dipropylene glycol methyl ether acetate |  |  |  |  | 10.00% |
|  | Total | 100% | 100% | 100% | 100% | 100% |
|  | Acrylic resin/ketone resin | 10.0 | 4.7 | 10.0 | 10.0 | 10.0 |
|  | Viscosity (mPa·s) | 5.1 | 5.0 | 5.1 | 5.1 | 5.0 |
|  | Flash point | 71° C. or above | 71° C. or above | 71° C. or above | 71° C. or above | 71° C. or above |
|  | Fine print | A | A | A | A | A |
|  | Solid fill | A | A | A | A | A |
|  | Anti-mottling property | A | A | A | A | A |
|  | Discharge stability | A | A | A | A | A |
|  | Resolubility of dried coating film | A | A | A | A | A |
|  | Rub resistance | A | A | A | A | A |
|  | Solvent resistance | A | A | A | A | A |

|  |  | Examples | | | | |
|---|---|---|---|---|---|---|
|  |  | 11 Black | 12 Black | 13 Black | 14 Black | 15 Black |
| Pigment | MA7 | 3.50% | 3.50% | 3.50% | 3.50% | 3.50% |
|  | G01 |  |  |  |  |  |
|  | RGT |  |  |  |  |  |
|  | D7110F |  |  |  |  |  |
| Dispersant | RB822 |  |  |  |  |  |
|  | SOLSPERSE 56000 |  |  |  |  |  |
|  | SOLSPERSE 39000 | 1.40% | 1.40% | 1.40% | 1.40% | 1.40% |
| Acrylic resin | BR-87 | 6.20% | 6.20% | 6.20% | 5.80% | 6.00% |
|  | BR-83 |  |  |  |  |  |
|  | BR-60 |  |  |  |  |  |
|  | BR-106 |  |  |  |  |  |
| Ketone resin | SK |  |  | 0.20% | 3.00% |  |
|  | AP | 0.50% | 1.00% |  |  | 3.20% |

TABLE 1-continued

| Solvent | | | | | | |
|---|---|---|---|---|---|---|
| | Diethylene glycol diethyl ether | 58.40% | 57.90% | 58.70% | 56.30% | 55.90% |
| | Diethylene glycol ethyl methyl ether | 20.00% | 20.00% | 20.00% | 20.00% | 20.00% |
| | Propylene carbonate | 10.00% | 10.00% | 10.00% | 10.00% | 10.00% |
| | Diethylene glycol ethyl ether acetate | | | | | |
| | Dipropylene glycol monomethyl ether | | | | | |
| | Dipropylene glycol methyl ether acetate | | | | | |
| | Total | 100% | 100% | 100% | 100% | 100% |
| | Acrylic resin/ketone resin | 12.4 | 6.2 | 31.0 | 1.9 | 1.9 |
| | Viscosity (mPa · s) | 4.9 | 5.0 | 4.9 | 5.0 | 5.1 |
| | Flash point | 71° C. or above | 71° C. or above | 71° C. or above | 71° C. or above | 71° C. or above |
| | Fine print | A | A | A | A | A |
| | Solid fill | A | A | A | A | A |
| | Anti-mottling property | A | A | A | A | A |
| | Discharge stability | A | A | A | B | B |
| | Resolubility of dried coating film | A | A | C | A | A |
| | Rub resistance | A | A | A | C | D |
| | Solvent resistance | A | A | A | C | D |

| | | Examples | | | Comparative Examples | |
|---|---|---|---|---|---|---|
| | | 16 Yellow | 17 Magenta | 18 Cyan | 1 Black | 2 Black |
| Pigment | MA7 | | | | 3.50% | 3.50% |
| | G01 | 3.00% | | | | |
| | RGT | | 3.00% | | | |
| | D7110F | | | 3.00% | | |
| Dispersant | RB822 | 1.20% | | | | |
| | SOLSPERSE 56000 | | 1.20% | 1.20% | | |
| | SOLSPERSE 39000 | | | | 1.40% | 1.40% |
| Acrylic resin | BR-87 | 5.80% | 5.80% | 6.20% | 6.50% | |
| | BR-83 | | | | | |
| | BR-60 | | | | | |
| | BR-106 | | | | | |
| Ketone resin | SK | 0.55% | 0.55% | 0.62% | | 3.00% |
| | AP | | | | | |
| Solvent | Diethylene glycol diethyl ether | 59.45% | 59.45% | 58.98% | 58.60% | 62.10% |
| | Diethylene glycol ethyl methyl ether | 20.00% | 20.00% | 20.00% | 20.00% | 20.00% |
| | Propylene carbonate | 10.00% | 10.00% | 10.00% | 10.00% | 10.00% |
| | Diethylene glycol ethyl ether acetate | | | | | |
| | Dipropylene glycol monomethyl ether | | | | | |
| | Dipropylene glycol methyl ether acetate | | | | | |
| | Total | 100% | 100% | 100% | 100% | 100% |
| | Acrylic resin/ketone resin | 10.5 | 10.5 | 10.0 | — | — |
| | Viscosity (mPa · s) | 5.0 | 5.0 | 5.0 | 5.0 | 2.1 |
| | Flash point | 71° C. or above | 71° C. or above | 71° C. or above | 71° C. or above | 71° C. or above |
| | Fine print | A | A | A | A | B |
| | Solid fill | A | A | A | A | A |
| | Anti-mottling property | A | A | A | A | A |
| | Discharge stability | A | A | A | A | C |
| | Resolubility of dried coating film | A | A | A | D | A |
| | Rub resistance | A | A | A | A | D |
| | Solvent resistance | A | A | A | A | D |

According to the results of Examples 1 to 18 shown in Table 1, these non-aqueous inkjet ink compositions conforming to the composition of the present invention have viscosities suitable for inkjet applications. In addition, these inkjet compositions provide inks which have excellent fine print reproducibility, solid fill property, and anti-mottling property, and which, when the acrylic resin and the ketone resin are contained at an "acrylic resin/ketone resin" ratio of 3.0 to 20.0, also exhibit excellent discharge stability, resolubility of dried coating film, rub resistance, and solvent resistance; that is, inks achieving various properties in a balanced manner. On the other hand, Comparative Example 1 in which no ketone resin was used resulted in poor resolubility of dried coating film. Also, Comparative Example 2 in which no acrylic resin was used resulted in particularly poor discharge stability as well as poor fine print reproducibility, rub resistance, and solvent resistance.

What is claimed is:

1. A non-aqueous inkjet ink composition containing an acrylic resin, a ketone resin, a pigment, and a pigment dispersant, and also containing propylene carbonate and diethylene glycol dialkyl ether as an organic solvent, wherein, in the ink composition, the propylene carbonate is contained by 5 to 25 percent by mass, and the diethylene glycol dialkyl ether is contained at a ratio of the diethylene glycol dialkyl ether to the propylene carbonate by mass, which ratio is 3.0 to 8.0, wherein the acrylic resin and the ketone resin are contained at an acrylic resin/ketone resin ratio by mass of 3.0 to 20.0.

2. The non-aqueous inkjet ink composition according to claim 1, wherein the diethylene glycol dialkyl ether is diethylene glycol ethyl methyl ether and/or diethylene glycol diethyl ether.

3. The non-aqueous inkjet ink composition according to claim 1, wherein the acrylic resin is contained by 1 to 15 percent by mass in the ink composition.

4. The non-aqueous inkjet ink composition according to claim 1, wherein the ketone resin is contained by 0.1 to 10 percent by mass in the ink composition.

5. The non-aqueous inkjet ink composition according to claim 2, wherein the acrylic resin is contained by 1 to 15 percent by mass in the ink composition.

6. The non-aqueous inkjet ink composition according to claim 2, wherein the ketone resin is contained by 0.1 to 10 percent by mass in the ink composition.

7. The non-aqueous inkjet ink composition according to claim 3, wherein the ketone resin is contained by 0.1 to 10 percent by mass in the ink composition.

* * * * *